(12) United States Patent
Bernardet

(10) Patent No.: US 6,347,142 B1
(45) Date of Patent: Feb. 12, 2002

(54) SIM CARD READER CONNECTOR

(75) Inventor: Jean-Baptiste Bernardet, Les Hopitaux Vieux (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/385,674

(22) Filed: Aug. 27, 1999

(30) Foreign Application Priority Data

Aug. 28, 1998 (FR) .............................. 98/10835

(51) Int. Cl.[7] .................................................. H04M 1/00
(52) U.S. Cl. .................................................. 379/433.09
(58) Field of Search .............................. 379/433, 428; 455/575, 90; 439/159; 235/380

(56) References Cited

U.S. PATENT DOCUMENTS 3,806,704 A * 4/1974 Shinal .......................... 235/380
5,470,241 A * 11/1995 Kaufman ..................... 439/159
5,790,659 A    8/1998 Strand .......................... 379/433

FOREIGN PATENT DOCUMENTS

DE    195 21 360 A1    5/1996
WO   WO 97/40466    10/1997

* cited by examiner

Primary Examiner—Jack Chiang
(74) Attorney, Agent, or Firm—Perman & Green, LLP

(57) ABSTRACT

The invention concerns a card reader connector (1) having an insulating frame (2) on which are arranged several electrical contacts (4), an arm (6) for positioning card (1) in the connector and ejection of the latter from the connector and means for holding card (1) in reading position. According to the invention, the arm (6) has a first end (10) having a shaft (12) allowing the rotation of said arm (6) and a second end (14) having a piece (16) that is found in contact with card (1) during the introduction and ejection of this latter, respectively, into the connector and during its ejection from the connector.

5 Claims, 1 Drawing Sheet

SIM CARD READER CONNECTOR

BACKGROUND OF THE DISCLOSURE

1. Field of the invention

The present invention concerns a connector for the SIM-type card reader operating according to contact friction technology. Cards of this type have a clearance forming a standardized angle designed to indicate the direction of introduction of the card in the connector.

The invention more particularly concerns a connector having an insulating frame on which are arranged several electrical contacts, an arm for positioning said card in the connector and respectively ejecting it from the connector, as well as a means for holding said card in the reading position.

In applications using SIM cards of this type, it is important to be certain that the card is correctly inserted and remains in the position that permits a nominal functioning of the microcircuit. Moreover, in order to simplify the manufacture and the operation of the connector, it is desired that the positioning means also serves as an ejection means of the card from said connector.

2. Description of the Prior Art

A system is known in the prior art, notably from German patent application DE 195 21,360, which permits immobilizing the card in the desired position. Such a system is made up of a lever which must be pushed manually once the card is introduced into the reader, this latter being pushed up to the required position.

This system does not permit holding the card in an optimal reading position with certainty and is not designed to eject the card from the connector.

SUMMARY OF THE INVENTION

The object of the invention is to produce a sure positioning of the SIM card in the connector and the ejection of this latter from said connector by one and the same piece.

Another object of the invention is to eliminate errors in manipulation and prevent the introduction of the card into the connector in the wrong direction.

In order to achieve these objects, the positioning and insertion arm equipping the connector according to the invention is characterized in that it comprises a first end having a shaft allowing the rotation of said arm and a second end having a piece which is found in contact with the card during the introduction of the latter into the connector and during its ejection from the connector.

Thus, by means of the rotational movement of the arm and by means of the permanent contact of the card with the piece, the card is positioned, ejected and held in reading positioning by means of one and the same piece. A notable simplification of the structure of the connector results from this

BRIEF DESCRIPTION OF THE DRAWINGS

Other characteristics and advantages of the invention will become apparent from the description which follows, taken by way of non-limiting example, in reference to the attached figures in which.

DESCRIPTION OF THE PREFERRED EMBODIMENTS

Figure 1:
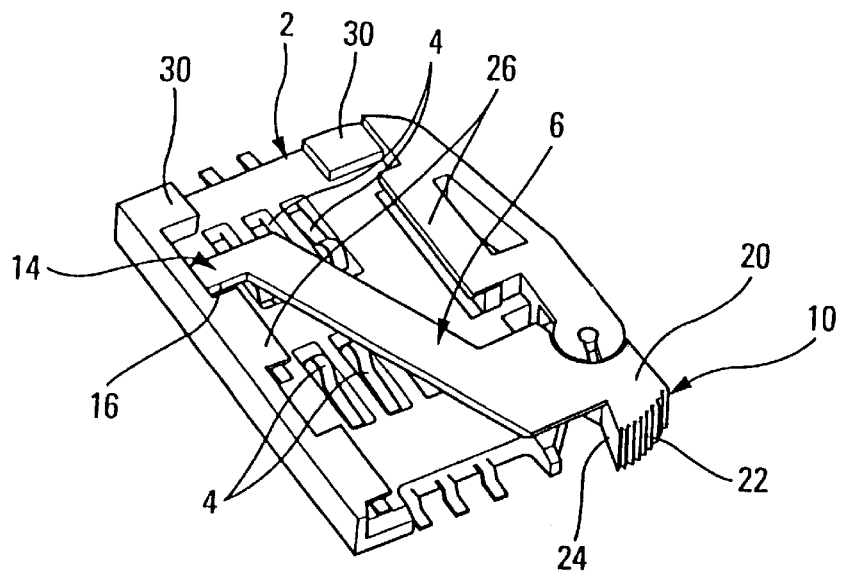
FIG. 1 shows a perspective view of a connector conforming to the invention.
Figure 2:
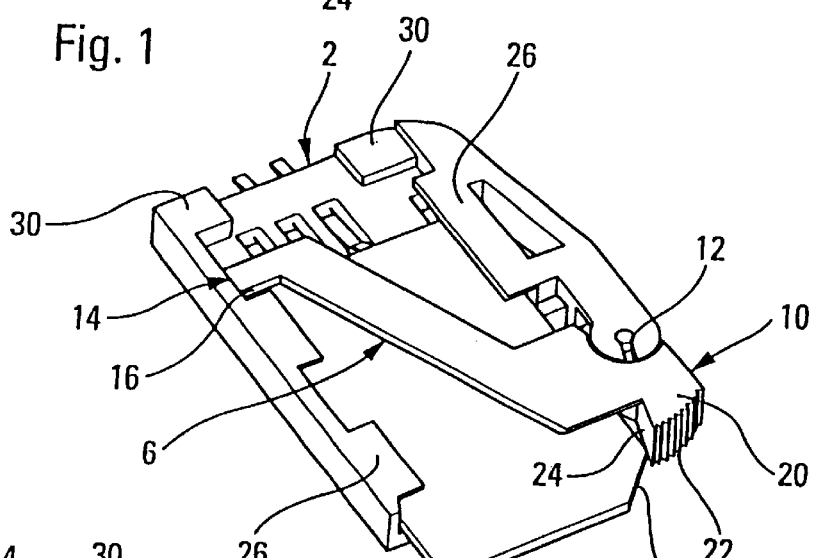
FIG. 2 shows a perspective view of the connector of FIG. 1 in which an SIM card has been partially introduced.
Figure 3:
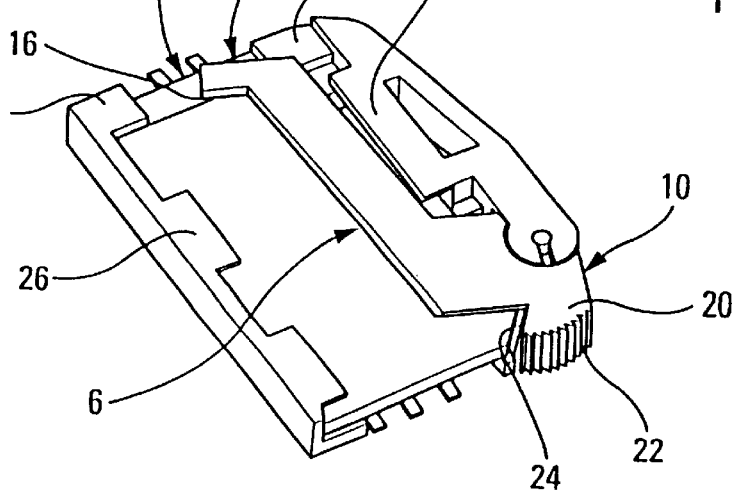
FIG. 3 shows a perspective view of the connector of FIG. 1 in which a SIM card has been completely introduced.

FIGS. 1, 2 and 3 show a view of a reader connector for a SIM-type card 1 having an insulating frame 2 on which are arranged several electrical contacts 4, an arm 6 for positioning card 1 in the connector and ejection of the latter from the connector as well as means for holding said card 1 in reading position.

As can be seen in FIGS. 1, 2 and 3, which illustrate a preferred mode of embodiment of the invention, arm 6 has a first end 10 projecting outside of the connector and having a shaft 12 allowing the rotation of said arm 6 and a second end 14 extending inside said connector and having a piece 16, which is found in contact with card 1 during the introduction of said card into the connector and during the ejection of this latter from said connector.

According to this mode of embodiment, means 8 for holding card 1 in reading position is made up of a piece 20 joined to arm 6 and having a striated outer face 22 accessible to an operator in order to manipulate arm 6 and an inner face 24 bearing a projection forming an angle practically identical to the standardized angle obtained by chamfer 30 made on one corner of card 1. Thus, during the introduction of the card into the connector, positioning arm 6 turns around shaft 12 and the projection of face 24 is worked perfectly into the standardized angle of card 1. When card 1 reaches the reading position, said inner face 24 rests on the chamfer of card 1 to hold it in reading position.

In order to facilitate the introduction of the card into the connector, this latter is provided with guiding means 26 for card 1 arranged over its entire length. Moreover, stop means 30 is provided in the connector on which card 1 comes to rest when it is in reading position. This position is indicated by a signal (luminous, for example) emitted by an end-of-course detector arranged in the connector.

What is claimed is:

1. A reader connector for a SIM card, the card having an insulating frame on which there is arranged several electrical contacts, an arm for both positioning the card in the connector and for respectively ejecting it from the connector and means for holding the card in a reading position, wherein the arm includes a first end portion, the end portion comprising a shaft adapted to permit the rotation of the arm and a second end portion having a first extended portion positioned to be in contact with the card during the introduction of the card into the connector and during the ejection of the card from the connector whereby due to both the rotational movement of the arm and the permanent contact of the card with the first extended portion, the card is positioned, ejected and supported in a reading position by a single element.

2. A reader connector for a SIM card according to claim 1, wherein said means for holding said card in the reading position is made up of a second extended portion that is joined with said arm and includes an outer face portion that is accessible to an operator to manipulate said arm and an inner face bearing a projection forming an angle substantially identical to a standardized angle obtained by a chamfer situated on one corner of said card so that during the introduction of said card into said connector said arm turns around said shaft and the projection is adapted to form the standardized angle with said card and further, when said card reaches the reading position, said inner face rests on said chamfer to hold said card in the reading position.

3. A reader connector for a SIM card according to claim 1, wherein said card includes means for guiding said card and stop means adapted to receive said card at rest when said card is in a reading position.

4. A reader connector for a SIM card according to claim 1, wherein said first end projects outside said connector while said second end extends inside said connector.

5. A reader connector for a SIM card according to claim 1, wherein said connector further comprises an end-of-course detector for said card when said card has reached said reading position.

* * * * *